(12) United States Patent
Leustek et al.

(10) Patent No.: US 7,644,584 B2
(45) Date of Patent: Jan. 12, 2010

(54) METHOD FOR MODULATING TURBOCHARGER BRAKING

(75) Inventors: Matthew Edward Leustek, Peoria, IL (US); Christopher Ronald Gehrke, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 4 days.

(21) Appl. No.: 11/605,970

(22) Filed: Nov. 30, 2006

(65) Prior Publication Data

US 2008/0127643 A1 Jun. 5, 2008

(51) Int. Cl.
*F02B 33/44* (2006.01)
*F02B 37/16* (2006.01)
*F02B 37/12* (2006.01)
*F02D 23/00* (2006.01)
*F01N 3/00* (2006.01)

(52) U.S. Cl. .............................. 60/611; 60/602; 60/606; 60/286

(58) Field of Classification Search .................... 60/606, 60/611, 602, 286, 303, 289, 291, 293
See application file for complete search history.

(56) References Cited

U.S. PATENT DOCUMENTS

| | | | | |
|---|---|---|---|---|
| 2,172,809 A * | 9/1939 | Schmitt | ...................... | 60/606 |
| 3,044,683 A * | 7/1962 | Woollenweber, Jr. | ......... | 60/606 |
| 4,452,043 A * | 6/1984 | Wallace | ....................... | 60/606 |
| 4,622,816 A * | 11/1986 | Boudigues | ................... | 60/606 |
| 4,674,283 A * | 6/1987 | Ishida et al. | .................. | 60/606 |
| 4,833,886 A * | 5/1989 | Meier | .......................... | 60/606 |
| 4,838,020 A * | 6/1989 | Fujitsuka | ..................... | 60/606 |
| 5,119,633 A | 6/1992 | Brooks et al. | ................. | 60/602 |
| 5,819,693 A * | 10/1998 | Curtil | ....................... | 123/65 E |
| 5,867,987 A | 2/1999 | Halimi et al. | ................. | 60/602 |
| 6,062,025 A | 5/2000 | Okada et al. | .................. | 60/602 |
| 6,085,524 A | 7/2000 | Persson | ...................... | 60/602 |
| 6,089,019 A | 7/2000 | Roby et al. | ................... | 60/602 |

(Continued)

FOREIGN PATENT DOCUMENTS

DE       43 12 12 077 C1       1/1994

(Continued)

OTHER PUBLICATIONS

PCT International Search Report; File Ref. 06-458; PCT/US2007/022722; Filing Date: Oct. 26, 2007; Applicant: Caterpillar Inc.

*Primary Examiner*—Thai Ba Trieu
(74) *Attorney, Agent, or Firm*—Finnegan, Henderson, Farabow, Garrett & Dunner

(57) ABSTRACT

A method for operating an internal combustion engine includes compressing intake air using a compressor, supplying the compressed intake air to at least one combustion chamber of the engine, operating the at least one combustion chamber to output exhaust gas, and directing the exhaust gas to an inlet of a turbine configured to drive the compressor. The method also includes directing the exhaust gas from an outlet of the turbine to an exhaust system, bypassing at least a portion of the compressed intake air around the at least one combustion chamber, and adjusting a geometry of the turbine from a first configuration to a second configuration. The turbine is in the second configuration when the at least the portion of the compressed intake air is bypassed around the at least one combustion chamber.

22 Claims, 2 Drawing Sheets

U.S. PATENT DOCUMENTS

| | | | |
|---|---|---|---|
| 6,263,672 B1 | 7/2001 | Roby et al. ................... 60/602 |
| 6,276,139 B1 | 8/2001 | Moraal et al. ................ 60/611 |
| 6,324,846 B1 | 12/2001 | Clarke ...................... 60/605.2 |
| 6,336,447 B1 | 1/2002 | Bartel et al. |
| 6,378,305 B1 | 4/2002 | Sumser et al. ............... 60/602 |
| 6,397,597 B1 | 6/2002 | Gartner ..................... 60/605.2 |
| 6,665,604 B2 | 12/2003 | Arnold ....................... 60/602 |
| 6,679,057 B2 | 1/2004 | Arnold ....................... 60/602 |
| 6,681,573 B2 | 1/2004 | Arnold ....................... 60/602 |
| 6,708,486 B2 * | 3/2004 | Hirota et al. ................. 60/286 |
| 6,748,741 B2 | 6/2004 | Martin et al. .............. 60/605.1 |
| 6,751,956 B2 | 6/2004 | Mayer et al. ................. 60/602 |
| 6,912,852 B2 * | 7/2005 | Gottemoller et al. .......... 60/606 |
| 6,948,314 B2 | 9/2005 | Arnold et al. ................ 60/612 |
| 6,973,787 B2 | 12/2005 | Klingel ....................... 60/612 |
| 7,065,958 B2 * | 6/2006 | Funk et al. ................... 60/286 |
| 7,121,788 B2 | 10/2006 | Daudel et al. ............... 415/159 |
| 7,162,861 B2 * | 1/2007 | Khair .......................... 60/606 |
| 7,254,948 B2 * | 8/2007 | Gustafson et al. ............. 60/611 |
| 7,281,378 B2 * | 10/2007 | Gu et al. .................... 60/605.2 |
| 2005/0011184 A1 * | 1/2005 | Price et al. ................... 60/286 |
| 2006/0070381 A1 | 4/2006 | Parlow et al. ................ 60/612 |

FOREIGN PATENT DOCUMENTS

| | | |
|---|---|---|
| DE | 4439573 A1 * | 5/1996 |
| FR | 2 864 994 | 7/2005 |
| GB | 2 390 642 A | 1/2004 |
| JP | 2007162545 A * | 6/2007 |
| WO | WO 2005017329 A1 * | 2/2005 |

\* cited by examiner

METHOD FOR MODULATING TURBOCHARGER BRAKING

TECHNICAL FIELD

The present disclosure relates generally to a method for modulating braking, and more particularly, to a method for modulating turbocharger braking.

BACKGROUND

Performance of an internal combustion engine may depend on the amount of combustion air that can be delivered to the intake manifold for combustion in the engine cylinders. Atmospheric pressure is often inadequate to supply the required amount of air for efficient operation of the engine. Turbochargers are frequently utilized to increase the output of an internal combustion engine. The turbocharger may include a turbine having a turbine wheel driven by exhaust gases from the engine, and one or more compressors having compressor wheels driven by the turbine through a turbocharger shaft connected to both the turbine wheel and the compressor wheel. The spinning compressor wheel is able to force ambient air into the engine combustion chambers at a higher pressure than the engine can otherwise aspirate, resulting in what is commonly referred to as "boost pressure." In this manner, a larger air mass and fuel mixture is achieved in the engine, which translates to greater engine output during combustion. The gain in engine output is directly proportional to the increase in air flow generated by the turbocharger boost pressure.

The boost pressure of the turbocharger may be modulated to optimize power output, for example, by varying the turbine geometry. Adjustable vanes disposed at the inlet nozzle may be used to control the flow of exhaust across the turbine wheel. The vanes can be opened incrementally wider to increase the flow cross-sectional area and permit greater gas flow across the turbine wheel, thereby causing the turbine wheel to spin at a slower speed and lowering the boost pressure. Alternatively, the vanes can be closed incrementally narrower to decrease the flow cross-sectional area and raise the boost pressure. Thus, the amount of boost pressure generated by the turbocharger can be regulated by varying the vane position.

The turbocharger having a variable turbine geometry may also provide braking for the internal combustion engine. During the braking operation, the vanes may be positioned in a restricted position in which the flow cross-sectional area is reduced, thereby increasing the exhaust pressure upstream of the turbine. The exhaust gas may flow with an increased velocity through the channels between the vanes, and the rotational velocity of the turbine wheel may increase. This increases the pressure boost of the compressor, thereby increasing the pressure of the intake air supplied to the engine. Therefore, the engine cylinders receive an increased charge pressure on the inlet side while the exhaust side experiences an elevated exhaust gas pressure. During engine operation, engine pistons may have to perform more work, for example, when there is a higher pressure in the exhaust side during the compression and exhaust strokes. Thus, increased braking can be achieved using a turbocharger with a variable turbine geometry and by setting the vanes at a restricted position.

One method of providing braking using a turbocharger with a variable turbine geometry is described in U.S. Pat. No. 6,062,025 (the '025 patent) issued to Okada et al. The '025 patent describes a brake system that includes a turbocharger and a controller for adjusting a flow cross-sectional area of a turbine in the turbocharger. By interrupting a supply of fuel to the engine, the air compressed in the combustion chamber of the engine is discharged, thereby decreasing an amount of exhaust gas output by the engine. If the exhaust flow output by the engine is small, the flow cross-sectional area of the turbine may be decreased to increase the turbine rotation speed.

Although the system of the '025 patent may permit an increase in turbine rotation speed even when the amount of exhaust gas produced by the engine decreases, additional control of the fuel injection system is necessary for interrupting the supply of fuel to the combustion chamber.

The disclosed system is directed to overcoming one or more of the problems set forth above.

SUMMARY OF THE INVENTION

In one aspect, the present disclosure is directed to a method for operating an internal combustion engine. The method includes compressing intake air using a compressor, supplying the compressed intake air to at least one combustion chamber of the engine, operating the at least one combustion chamber to output exhaust gas, and directing the exhaust gas to an inlet of a turbine configured to drive the compressor. The method also includes directing the exhaust gas from an outlet of the turbine to an exhaust system, bypassing at least a portion of the compressed intake air around the at least one combustion chamber, and adjusting a geometry of the turbine from a first configuration to a second configuration. The turbine is in the second configuration when the at least the portion of the compressed intake air is bypassed around the at least one combustion chamber.

In another aspect, the present disclosure is directed to an internal combustion engine system. The system includes at least one combustion cylinder outputting exhaust gas and a turbocharger. The turbocharger includes a compressor configured to compress intake air supplied to the at least one combustion cylinder and a turbine configured to drive the compressor. The turbine has a variable geometry and is configured to receive the exhaust gas from the at least one combustion cylinder. The system also includes a bypass flow path allowing at least a portion of the compressed intake air to bypass the at least one combustion cylinder, an exhaust system configured to receive the exhaust gas from the turbine, and a controller coupled to the turbine. The controller is configured to adjust the geometry of the turbine from a first configuration to a second configuration. The turbine is in the second configuration when the compressed intake air is directed through the bypass flow path.

In yet another aspect, the present disclosure is directed to a method for operating an internal combustion engine. The method includes compressing intake air using a compressor, supplying the compressed intake air to at least one combustion chamber of the engine, directing at least a portion of the compressed intake air through a bypass flow path toward an exhaust system, and operating the at least one combustion chamber to output exhaust gas. The method also includes directing the exhaust gas to a turbine configured to drive the compressor, directing the exhaust gas from the turbine to the exhaust system, and maintaining a desired characteristic of the turbine by controlling an amount of the compressed intake air directed to the at least one combustion chamber.

DETAILED DESCRIPTION

Figure 1:
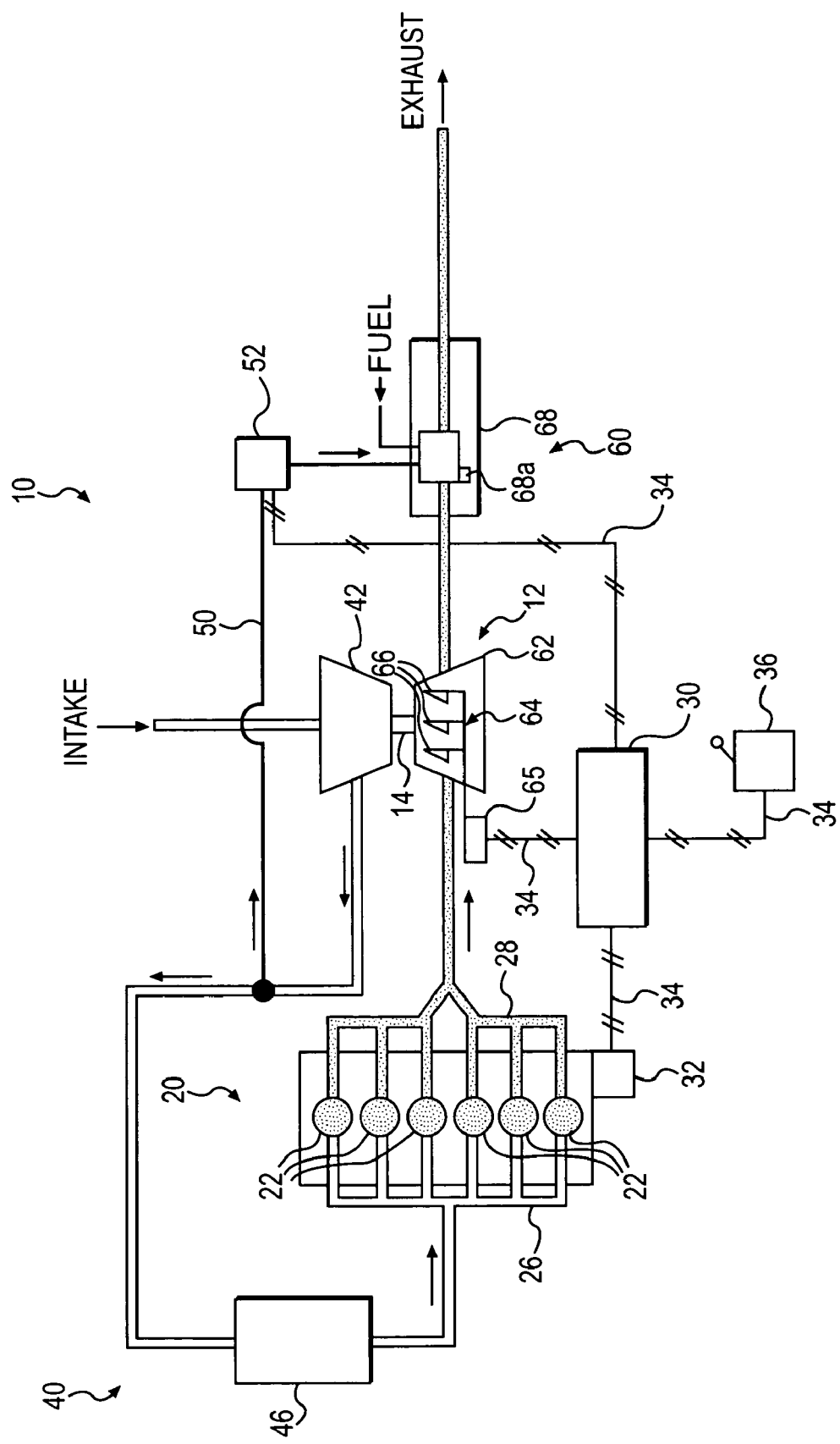
FIG. 1 is a diagrammatic illustration of an exemplary disclosed internal combustion engine.

FIG. 1 illustrates an exemplary turbocharger braking system 10, for a powered system, such as a machine (not shown).

The turbocharger braking system 10 includes a power source. In the exemplary turbocharger braking system 10, the power source is an internal combustion engine 20, e.g., a diesel engine, a gasoline engine, a gaseous fuel-powered engine, and the like, or any other engine apparent to one skilled in the art. Alternatively, the engine 20 may be another source of power, such as a furnace, or another suitable source of power for a powered system, such as a factory or power plant.

The engine 20 includes a plurality of cylinders that each define a combustion chamber 22. Each cylinder includes at least one intake port (not shown) that may be opened and closed using an intake valve assembly (not shown) to direct compressed intake air to the combustion chamber 22 and at least one exhaust port (not shown) that may be opened and closed using an exhaust valve assembly (not shown) to output exhaust gas from the combustion chamber 22. The engine 20 may include an intake manifold 26 that receives the compressed intake air and allows the compressed intake air to flow to the combustion chambers 22. An exhaust manifold 28 may receive the exhaust gas that is output from the combustion chambers 22.

In the exemplary embodiment, the turbocharger braking system 10 also includes an exhaust system 60. The engine 20 and the exhaust system 60 may be connected to a control system 30. Alternatively, the control system 30 may be integrated into the engine 20 and/or the exhaust system 60. The control system 30 is capable of transmitting signals to the engine 20 and the exhaust system 60, as described below. The control system 30 may be, for example, an electronic control module ("ECM"), a central processing unit, a personal computer, a laptop computer, or any other control device known in the art. The control system 30 may receive input via communication lines 34 from a variety of sources including, for example, a sensor 32, e.g., configured to measure speed and/or other operating characteristics of the engine 20. In the exemplary embodiment, the sensor 32 is an engine speed sensor that senses an engine speed. The control system 30 may use this input to form a control signal based on a pre-set control algorithm. The control signal may be transmitted from the control system 30 to various actuation devices (described in greater detail below) across the communication lines 34.

The exemplary embodiment of the turbocharger braking system 10 also includes an air induction system 40. The air induction system 40 receives fresh intake air from, for example, an air cleaner (not shown) and/or the atmosphere, and supplies compressed intake air to the combustion chambers 22. For example, the air induction system 40 may include a compressor 42 and one or more air coolers 46. It is contemplated that additional components can be included in the air induction system 40 such as, for example, additional valves, one or more air cleaners, one or more waste gates, a control system, and other configurations for introducing the compressed intake air into the combustion chambers 22.

The compressor 42 may be configured to compress the atmospheric air received by the air induction system 40 to a predetermined pressure level. The compressor 42 may be a fixed geometry compressor, a variable geometry compressor, or any other type of compressor known in the art.

The air cooler 46 may be, for example, an air-to-air aftercooler ("ATAAC"). The air cooler 46 may be fluidly connected to an output of the compressor 42 via a fluid passageway so that the air cooler 46 may cool the compressed intake air from the output of the compressor 42. The outlet of the air cooler 46 may be connected to the intake manifold 26 via a fluid passageway such that the intake manifold 26 of the engine 20 receives the cooled and compressed intake air from the air induction system 40.

The engine 20 outputs exhaust gas via the exhaust manifold 28 to the exhaust system 60 via a fluid passageway. The exhaust system 60 may include one or more turbines 62 and additional components such as, e.g., an aftertreatment system 68 (e.g., an emission controlling device, such as one or more of a particulate filter, regeneration device, particulate trap, nitrogen oxide (NOx) adsorber, other catalytic device, and the like), an attenuation device, or other measure for directing the flow of exhaust gas out of the engine 20, that is known in the art. The aftertreatment system 68 may be connected to the output of the turbine 62 via a fluid passageway to receive the flow of exhaust gas from the turbine 62.

As shown in the exemplary embodiment of FIG. 1, the compressor 42 and the turbine 62 are coupled via a shaft 14 to form a turbocharger 12. The turbocharger 12 may extract energy from the exhaust gas and use this energy to boost intake charge pressure (e.g., the pressure of the combustion gas). The turbine 62 is configured to drive the connected compressor 42 and includes a variable geometry unit 64. The variable geometry unit 64 optionally has features such as those associated with commercially available variable geometry turbines, e.g., the variable geometry unit 64 may include an adjustable vane assembly that includes multiple adjustable vanes 66 for controlling the flow of exhaust gas across the turbine 62 by controlling a flow cross-sectional area.

The variable geometry unit 64 may be optionally positioned at, or proximate to, an exhaust inlet to the turbine 62. Exhaust gas from the engine 20 diverted to the turbine 62 causes the shaft 14 to rotate, which, in turn, rotates the compressor 42. When rotating, the compressor 42 energizes the combustion gas (e.g., the intake air) to produce a "boost" in combustion gas pressure (e.g., force per unit area or energy per unit volume), which is commonly referred to as "boost pressure." In this manner, the turbocharger 12 may help to provide a larger mass of combustion gas to the engine 20, which may result in greater engine output during combustion.

The variable geometry unit 64 may include an actuator 65 for controlling the position of the adjustable vanes 66. The actuator 65 may be a mechanical actuator that mechanically alters the position of the vanes 66. The position of the vanes 66 may be adjusted as known in the art to control the flow of exhaust gas across the turbine 62, e.g., to vary a flow cross-sectional area of the turbine 62. The actuator 65 is capable of receiving control signals from the control system 30 via the communication line 34, for example, for adjusting the position of the vanes 66. By changing the flow cross-sectional area of the turbine 62, the rotation speed of the turbine 62 may be adjusted independently of the amount of exhaust gas supplied to the turbine 62. For example, movement of the vanes 66 towards the fully closed position may direct the exhaust flow more tangentially to the turbine 62, which, in turn, imparts more energy to the turbine 62 and, consequently, increases boost of the compressor 42. Conversely, movement of the vanes 66 towards the fully open position may direct the flow of exhaust gas more radially to the turbine 62, which, in turn, reduces energy to the turbine 62 and, consequently, decreases the compressor boost.

According to one exemplary embodiment of the variable geometry unit 64, the position of the vanes 66 may be continuously variable between a fully open position and a fully closed position. The vanes 66 may be set at an infinite number of positions, such as the fully closed and fully open positions described above. The control system 30 may send control signals to the actuator 65, e.g., periodically at regular time intervals and/or after a predetermined event occurs, to adjust the position of the vanes 66.

According to another exemplary embodiment of the variable geometry unit 64, the position of the vanes 66 may only be fixed (or locked) at one position during braking, e.g., a restricted position. For example, prior to or during braking, the position of the vanes 66 may be changed from a fully open (or substantially open) position to the restricted position, e.g., a position between the fully open (or substantially open) and the fully closed positions. The position of the vanes 66 at the restricted position may be specified by an actuator command from the control system 30 and may be a position that provides a maximum braking capability, as described below. Thus, when the vanes 66 are at the fully open position, the actuator 65 may receive the actuator command from the control system 30 to move the vanes 66 to the restricted position, which is specified by the control system 30.

A bypass flow path 50 may direct at least a portion of the flow of compressed intake air from the compressor 42 to the exhaust system 60. In the exemplary embodiment shown in FIG. 1, the bypass flow path 50 directs the flow of compressed intake air to the aftertreatment system 68, which includes a regenerating device, e.g., an ignitor 68*a*. In the aftertreatment system 68, the flow of compressed intake air may be mixed with fuel injected into the aftertreatment system 68 using a fuel injector (not shown). Then, the regeneration device may increase the temperature of the air-fuel mixture, e.g., by igniting the air-fuel mixture with the ignitor 68*a*.

A bypass valve 52 is disposed in the bypass flow path 50 and may be actuated to bypass at least a portion of the compressed intake air around the engine 20 and the turbine 62. Therefore, the bypass valve 52 may be actuated to control an amount of compressed intake air supplied to the intake manifold 26 and to the combustion chambers 22 of the engine 20. The bypass valve 50 may be selectively actuated by the control system 30, as described below. The bypass valve 52 may be a throttle valve, a spool valve, a shutter valve, a butterfly valve, a check valve, a diaphragm valve, a gate valve, a shuttle valve, a ball valve, a globe valve, or any other valve known in the art. The bypass valve 52 may be solenoid-actuated, hydraulically-actuated, pneumatically-actuated, or actuated in any other manner.

The control system 30 is connected to the bypass valve 52 and may be used to control the amount of compressed intake air directed to the bypass flow path 50, thereby controlling the amount of compressed intake air supplied to the combustion chambers 22. The bypass valve 52 may be normally closed and may be actuated to open during the braking operation. The bypass valve 52 may be actuated or otherwise controlled by, for example, a solenoid or other actuation device known in the art (not shown). The bypass valve 52 is capable of receiving control signals from the control system 30 via the communication line 34, for example, to actuate the bypass valve 52.

The control system 30 may be connected to at least one operator input device 36 that allows an operator to input an operator input command using one or more control devices known in the art, such as one or more pedals, switches, dials, paddles, joysticks, etc. In the exemplary embodiment, the operator input command may indicate an activation of the turbocharger braking system 10. For example, the operator input device 36 may be an on/off switch for activating or deactivating the braking operation. Alternatively, the operator input command may indicate an expected or desired engine speed and/or acceleration.

Figure 2:
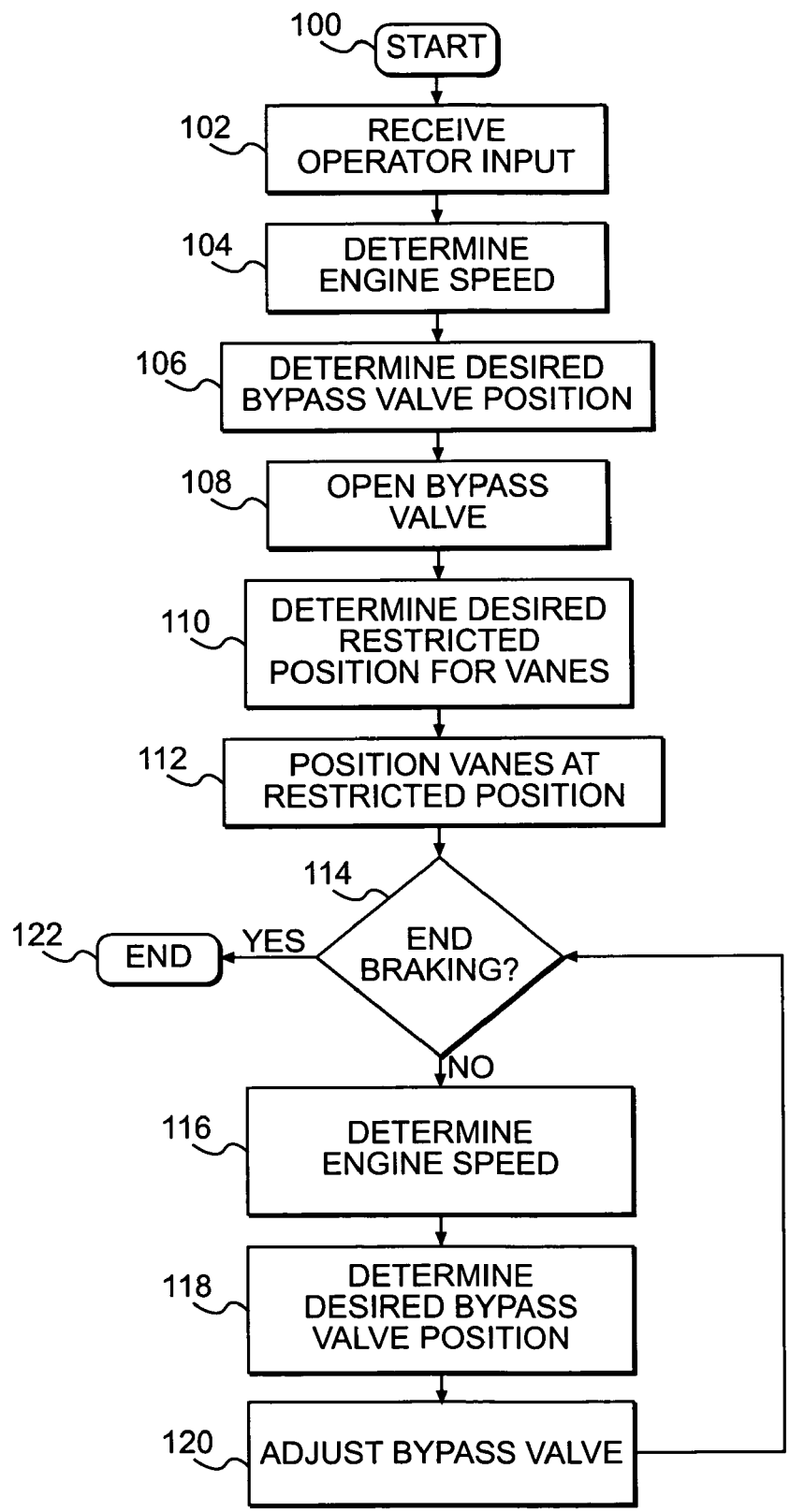
FIG. 2 is a flow chart illustrating an exemplary disclosed method of operating the internal combustion engine of FIG. 1.

FIG. 2 illustrates a flow chart showing an exemplary method for modulating turbocharger braking using the exemplary turbocharger braking system 10 shown in FIG. 1. The method for modulating the braking operation starts at step 100 and proceeds to step 102 where the control system 30 receives from the operator input device 36 the operator input command activating the braking operation. Then, in step 104, the control system 30 receives a signal from the sensor 32 indicating one or more engine operating conditions, such as the engine speed, measured by the sensor 32.

The bypass valve 52 may be at a fully (or substantially) closed position. Accordingly, the compressed intake air is not permitted to flow through the bypass flow path 50 or is substantially prevented from being able to flow through the bypass flow path 50. In step 106, the control system 30 determines a valve command indicating a desired (or expected) position of the bypass valve 52 for opening the bypass valve 52. The desired position of the bypass valve 52 may be a fully open or fully closed position or another position therebetween. The desired position of the bypass valve 52 may be determined based on one or more engine operating conditions, e.g., the engine operating conditions measured in step 104, such as the measured engine speed. Furthermore, the control system 30 may be programmed with one or more mappings to determine the desired position of the bypass valve 52. The mappings may be created through experimentation and may relate the desired position of the bypass valve 52 to one or more engine operating parameters (e.g., the measured engine speed), one or more operating characteristics of the turbine 62 (e.g., the predicted pressure drop across the turbine 62, the geometry of the turbine 62), and/or other operating parameters relating to the engine 20, etc. For example, experimentation may be performed to determine the desired valve position for providing maximum braking capacity, e.g., when the pressure drop across the turbine 62 is higher than a predetermined threshold or within a predetermined range. This determination may also depend on the measured engine speed and/or the geometry of the turbine 62.

In step 108, the control system 30 sends the valve command to the bypass valve 52 to open the bypass valve 52. As a result, at least a portion of the compressed intake air may be permitted to flow through the bypass flow path 50 toward the aftertreatment system 68 in the exhaust system 60, thereby lowering the amount of compressed intake air supplied to the engine 20.

The vanes 66 of the turbine 62 may be positioned at a fully (or substantially) open position. In step 110, the control system 30 determines an actuator command for the actuator 65 indicating a desired (or expected) position of the vanes 66, e.g., a restricted position. The desired position of the vanes 66 may be a fully open or fully closed position or another position therebetween. The desired position of the vanes 66 may be determined based on one or more engine operation conditions, e.g., the engine operating conditions measured in step 104 (e.g., the measured engine speed), a parameter related to the amount of compressed intake air supplied to the engine 20 (e.g., the desired position of the bypass valve 52 determined in step 106, a flow rate through the bypass flow path 50), etc. Furthermore, the control system 30 may be programmed with one or more mappings to determine the desired position of the vanes 66. The mappings may be created through experimentation and may relate the desired position of the vanes 66 to one or more engine operating parameters (e.g., the measured engine speed), one or more operating characteristics of the bypass flow path 50 (e.g., the desired position of the bypass valve 52, a flow rate through the bypass flow path 50), one or more operating characteristics of the turbine 62 (e.g., the predicted pressure drop across the turbine 62, the geometry of the turbine 62), and/or other operating parameters relating to the engine 20, etc. For example, experimentation may be performed to determine the desired position of the turbine vanes 66 for providing maximum braking capacity, e.g., when the pressure drop across the turbine 62 is higher than a predetermined threshold or within a predetermined range. This determination may also depend on the position of the bypass valve 52 and/or the geometry of the turbine 62. For example, the vanes 66 may be set at a more closed position when the bypass valve 52 is set at a more open position. In this manner, both the desired position of the bypass valve 52 and the predicted pressure drop across the turbine 62 may be determined based on the measured engine speed.

In step 112, the control system 30 sends the actuator command to the actuator 65 to position the vanes 66 at the desired restricted position. Alternatively, the control system 30 may determine the actuator command (and/or send the actuator command to the actuator 65) before or at the same time as determining the valve command (and/or sending the valve command to the bypass valve 52).

With the vanes 66 positioned at the restricted position, the flow cross-sectional area of the turbine 62 is smaller than the flow cross-sectional area when the vanes 66 are set at a fully open position. By decreasing the flow cross-sectional area of the turbine 62, the rotational speed of the turbine 62 may remain relatively high even though the amount of exhaust gas supplied to the turbine 62 has decreased (due to the portion of the compressed intake air directed through the bypass flow path 50 to the exhaust system 60, thereby bypassing the engine 20 and the turbine 62). By maintaining a relatively high rotational speed of the turbine 62, the pressure drop of the turbine 62 and the boost pressure of the compressor 42 may remain relatively high. Furthermore, with the vanes 66 at the restricted position, braking is performed on the engine 20, thereby decreasing the engine speed and producing a braking force for the machine.

In step 114, the control system 30 determines whether to end the braking operation. For example, the control system 30 may receive from the operator input device 36 an operator input command deactivating the braking operation, and/or the control system 30 may detect a predetermined condition, e.g., the engine speed has dropped below a predetermined threshold (step 114; yes). Control then proceeds to step 122, and the method for modulating the braking operation is complete.

The control system 30 may determine not to end the braking operation (step 114; no). For example, the control system 30 may determine that the operating input command deactivating the braking operation has not been received from the operator input device 36, and/or that the control system has not detected the predetermined condition. Then, in step 116, the control system 30 receives another signal from the sensor 32 indicating one or more engine operating conditions, such as the engine speed, measured by the sensor 32.

In step 118, the control system 30 determines a valve command indicating a desired (or expected) position of the bypass valve 52, e.g., a valve command for at least partially closing or at least partially opening the bypass valve 52. The desired position of the bypass valve 52 may be the fully closed position, the fully open position, or another position between the fully open and fully closed positions. The desired position of the bypass valve 52 may be determined based on the parameters and using the mappings described above with regard to step 106.

In step 120, the control system 30 sends the valve command to the bypass valve 52 to adjust the bypass valve 52. For example, the valve command may be used to adjust the bypass valve 52 towards the fully closed position if the engine speed has decreased. Accordingly, a lesser amount of the compressed intake air may be permitted to flow through the bypass flow path 50, thereby increasing the amount of compressed intake air supplied to the engine 20. Since the amount of compressed intake air to the engine 20 increases, the amount of exhaust gas produced by the engine 20 may increase. In the meantime, the engine speed has decreased and the vanes 66 of the turbine 62 remain at the restricted position. Even though the engine speed has decreased and the flow cross-sectional area of the turbine 62 remains constant (since the position of the vanes 66 is unchanged), the rotational speed of the turbine 62 may remain relatively high since a greater amount of exhaust gas is supplied to the turbine 62. As a result, the pressure drop of the turbine 62 and the boost pressure of the compressor 42 may remain relatively high.

In some situations, the engine speed may increase during braking, e.g., when a transmission in the machine downshifts, when the machine is coasting downhill, etc. In such situations, the valve command may be used to adjust the bypass valve 52 towards the fully open position. Accordingly, a greater amount of the compressed intake air may be permitted to flow through the bypass flow path 50, thereby decreasing the amount of compressed intake air supplied to the engine 20. However, the amount of exhaust gas produced by the engine 20 may increase since the engine speed has increased. Moreover, the amount of exhaust gas produced by the engine 20 may increase while the flow cross-sectional area of the turbine 62 remains constant (since the position of the vanes 66 is unchanged). Accordingly, the rotational speed of the turbine 62 may remain relatively high, and as a result, the pressure drop of the turbine 62 and the boost pressure of the compressor 42 may remain relatively high.

Control then proceeds to step 114, and the control system 30 determines whether to end the braking operation, as described above. If so (step 114; yes), then control proceeds to step 122, and the method for modulating the braking operation is complete. If not (step 114; no), the control system 30 determines the engine speed (step 116) and a desired bypass valve position (step 118), continues adjusting the bypass valve position (step 120), and then determines again whether to end the braking operation (step 114).

INDUSTRIAL APPLICABILITY

The disclosed method for modulating turbocharger braking may be applicable to a powered system that includes a turbocharger. The disclosed method may provide increased braking capacity for an internal combustion engine over a wide range of engine speeds. The method for modulating turbocharger braking will now be explained.

A portion of the intake air may be compressed by the compressor 42, which is driven by the exhaust-propelled turbine 62. The compressed intake air may be directed to the air cooler 46 where the compressed air is cooled. The cooled and compressed intake air is then directed to the engine 20, and the exhaust gas output by the engine 20 propels the turbine 62 and is directed to the aftertreatment system 68. When the braking operation is deactivated, the bypass valve 52 may be in the fully closed position, thereby preventing any compressed intake air from entering the bypass flow path 50 such that all of the compressed intake air is directed to the engine 20.

When the braking operation is activated, e.g., by a operator input command received by the operator input device 36, the engine speed may be determined using the engine speed sensor 32. The control system 30 may open the bypass valve 52 by sending a signal indicating the desired valve position to the valve 52. The compressed intake air directed through the bypass flow path 50 may be supplied to and used in the aftertreatment system 68. Thus, the amount of compressed intake air supplied to the engine 20 may decrease, and less exhaust gas may be produced by the engine 20 and supplied to the turbine 62. The control system 30 may also position the vanes 66 of the turbine 62 to a restricted position. Exhaust gas may build up upstream of the turbine 62, thereby resisting the pressurization of the air during the compression stroke of the engine 20 and/or resisting the exit of exhaust gas from the engine cylinders during the exhaust stroke of the engine 20, which may slow down the engine 20. More work is required to pass the exhaust gas through the turbine 62. Therefore, when the vanes 66 are at the restricted position, there may be an increased braking capacity. As a result, at a higher engine speeds, the bypass valve 52 may be opened and the vanes 66 of the turbine 62 may be set at a restricted position in order to maintain a high pressure drop across the turbine 62 while providing increased braking capacity. In other words, at higher engine speeds, a relatively large pressure drop across the turbine 62 may be maintained by decreasing the flow cross-sectional area of the turbine 62 even when the amount of exhaust gas supplied to the turbine 62 is decreased.

The engine speed may then decrease while the turbine vanes 66 remain in the restricted position. As the engine speed decreases, the control system 30 may periodically monitor the engine speed using the sensor 32. Based on the measured engine speed, the control system 30 may adjust the position of the bypass valve 52 by closing the valve 52 incrementally so that the bypass valve 52 may be brought to the fully closed position. The position of the bypass valve 52 may be determined, for example, based on the restricted position of the vanes 66 and the measured engine speed. Accordingly, more compressed intake air may be supplied to the engine 20, and therefore more exhaust gas may be produced by the engine 20 and sent to the turbine 62. Thus, at lower engine speeds, the amount of compressed intake air supplied to the engine 20 may be increased while the turbine vanes 66 remain in the restricted position in order to maintain a high pressure drop across the turbine 62. In other words, at lower engine speeds, a relatively large pressure drop across the turbine 62 may be maintained by incrementally increasing the amount of mass flow supplied to the engine 20, even though the flow cross-sectional area of the turbine 62 remains the same and the engine speed is decreasing. At the same time, braking capacity may be maximized.

Alternatively, the engine speed may increase while the turbine vanes 66 are in the restricted position, such as when the transmission is downshifted and/or when the machine coasts downhill. As the engine speed increases, the control system 30 may periodically monitor the engine speed using the sensor 32. Based on the measured engine speed, the control system 30 may adjust the position of the bypass valve 52 by opening the valve 52 incrementally. The position of the bypass valve 52 may be determined, for example, based on the restricted position of the vanes 66 and the measured engine speed. Although less compressed intake air may be supplied to the engine 20, the engine speed has increased, thereby increasing the flow of exhaust gas produced by the engine 20 and sent to the turbine 62. Thus, at higher engine speeds, a high pressure drop across the turbine 62 may be maintained since the flow of exhaust gas produced by the engine 20 may increase. Moreover, this high pressure drop across the turbine 62 may be maintained even though the amount of compressed intake air supplied to the engine 20 may decrease and the turbine vanes 66 may be in the restricted position. At the same time, braking capacity may be maximized.

In some turbochargers, the position of the vanes 66 in the turbine 62 cannot be continuously modulated during braking. For example, the position of the vanes 66 may only be locked at one position during braking. Thus, as described above, after braking has been initiated by the operator via the operator input device 36, the bypass valve 52 may be opened and the vanes 66 may be moved to the restricted position and locked at the restricted position, e.g., a position that provides a high pressure drop across the turbine 62 at the high engine speed, as determined using the mappings stored in the control system 30. Although the restricted position may produce a high pressure drop across the turbine 62 and a maximum braking capability at high engine speeds, it may provide limited braking capability as the engine speed decreases. Therefore, the position of the bypass valve 52 may be modulated as described above to increase the amount of compressed intake air supplied to the engine 20, thereby increasing the amount of exhaust gas produced by the engine 20. By increasing the amount of exhaust gas directed to the turbine 62 as the engine speed decreases and while maintaining the flow cross-sectional area of the turbine 62 constant (since the vanes 66 are locked at the restricted position), the rotational speed of the turbine 62 may remain relatively high. Thus, the high pressure drop across the turbine 62 may be maintained throughout the transition from a higher engine speed to a lower engine speed. Accordingly, an increased braking capacity may be maintained over a wide range of engine speeds even in turbochargers that are unable to be continuously modulated. The bypass valve 52 allows modulation of the amount of mass flow supplied to the engine 20 and directed from the engine 20 to the turbine 62. This modulation of mass flow provides additional flexibility to allow optimum braking performance over a wide range of engine speeds, instead of being limited to a single engine speed. This optimization of braking performance may be performed even when the vanes 66 are locked at a single position during the braking operation.

The control system 30 determines the desired valve position of the bypass valve 52 and/or the desired vane position of the turbine vanes 66. The desired valve position and/or vane position for achieving a high braking capacity may be predetermined by experimentation and stored in the control system 30 using one or more mappings. Thus, the control system 30 may determine an optimal desired valve position of the bypass valve 52 and/or desired vane position of the turbine vanes 66 during the braking operation, and may make the determination in real time based one or more variables such as the measured engine speed, the geometry of the turbine 62, etc.

It will be apparent to those skilled in the art that various modifications and variations can be made to the method for modulating turbocharger braking. Other embodiments will be apparent to those skilled in the art from consideration of the specification and practice of the disclosed method for modulating turbocharger braking. It is intended that the specification and examples be considered as exemplary only, with a true scope being indicated by the following claims and their equivalents.

What is claimed is:

1. A method for operating an internal combustion engine, comprising:
   compressing intake air using a compressor;
   supplying the compressed intake air to at least one combustion chamber of the engine;
   operating the at least one combustion chamber to output exhaust gas;
   directing the exhaust gas to an inlet of a turbine configured to drive the compressor;
   directing the exhaust gas from an outlet of the turbine to an exhaust system;
   determining a speed of the engine;
   decreasing the speed of the engine by determining a desired second configuration of the turbine,
   adjusting a turbine geometry from a first configuration to the desired second configuration based on the determined engine speed, and
   bypassing at least a portion of the compressed intake air around the at least one combustion chamber when the turbine is in the desired second configuration;
      wherein the adjusting of the turbine geometry to the second configuration includes locking a plurality of vanes of the turbine at a restricted position and maintaining the plurality of vanes at the restricted position until a predetermined engine operating condition is fulfilled.

2. The method of claim 1, further including:
   determining an operating condition of the engine; and
   determining an amount of the compressed intake air bypassing the combustion chamber based on the operating condition of the engine.

3. The method of claim 1, wherein the bypassing of the at least the portion of the compressed intake air around the at least one combustion chamber includes directing the portion of the compressed intake air through a bypass flow path fluidly connecting an outlet of the compressor to the exhaust system.

4. The method of claim 3, wherein the bypassing of the at least the portion of the compressed intake air around the at least one combustion chamber includes controlling a bypass valve disposed in the bypass flow path, the bypass valve controlling an amount of the compressed intake air bypassing the at least one combustion chamber.

5. The method of claim 4, further including determining a position of the bypass valve based on the engine speed.

6. The method of claim 1, wherein the adjusting of the turbine geometry to the second configuration includes setting a plurality of vanes of the turbine at a restricted position when the at least the portion of the compressed intake air is bypassed around the at least one combustion chamber.

7. The method of claim 6, further including decreasing the amount of the compressed intake air bypassing the at least one combustion chamber when the turbine geometry is set at the restricted position.

8. The method of claim 6, wherein the adjusting of the turbine geometry is based on the engine speed and a desired pressure drop across the turbine.

9. The method of claim 1, wherein the predetermined condition is a signal from an operator input device.

10. The method of claim 1, further including permitting substantially all of the compressed intake air to flow to the at least one combustion chamber when the turbine is in the first configuration.

11. The method of claim 1, further including directing the compressed intake air bypassing the at least one combustion chamber to an aftertreatment system of the exhaust system.

12. The method of claim 11, further including mixing the compressed intake air directed to the aftertreatment system with fuel.

13. The method of claim 12, further including igniting the mixture of the compressed intake air and fuel.

14. The method of claim 1, further including:
sensing an operating condition of the engine; and
adjusting the amount of the compressed intake air bypassing the at least one combustion chamber based on the sensed condition when the turbine geometry is locked in the second configuration.

15. The method of claim 1, further including:
determining whether a predetermined engine operating condition is fulfilled; and
determining whether to initiate decreasing the engine speed of the engine in response to determining that the predetermined engine operating condition is fulfilled.

16. The method of claim 15, wherein the predetermined condition includes a signal from an operator input device.

17. The method of claim 1, wherein the determining the desired second configuration of the turbine is based on at least one of a determined engine operating condition and a parameter related to an amount of the compressed air bypassing the combustion chamber.

18. The method of claim 1, wherein the determining the desired second configuration of the turbine includes determining a degree to which a variable geometry unit of the turbine is opened.

19. A method for operating an internal combustion engine, comprising:
compressing intake air using a compressor;
supplying the compressed intake air to at least one combustion chamber of the engine;
directing at least a portion of the compressed intake air through a bypass flow path toward an exhaust system;
operating the at least one combustion chamber to output exhaust gas;
directing the exhaust gas to a turbine configured to drive the compressor; directing the exhaust gas from the turbine to the exhaust system; and
maintaining a desired characteristic of the turbine by controlling an amount of the compressed intake air directed to the at least one combustion chamber;
wherein the maintaining of the desired turbine characteristic further includes adjusting of a turbine geometry,
wherein the adjusting of the turbine geometry includes setting the turbine geometry at a restricted position when the at least a portion of the compressed intake air is directed through the bypass flow path, and
wherein the maintaining of the desired turbine characteristic further includes decreasing an amount of the compressed intake air flowing through the bypass flow path while maintaining the turbine geometry at the restricted position.

20. The method of claim 19, wherein the desired turbine characteristic is a desired range of pressure drop.

21. The method of claim 19, wherein the maintaining of the desired turbine characteristic further includes:
determining an engine speed; and
determining an amount of the compressed intake air directed through the bypass flow path based on the determined engine speed and the desired turbine characteristic.

22. The method of claim 19, wherein the setting of the turbine at the restricted position includes determining the restricted position based on the desired turbine characteristic.

* * * * *